United States Patent [19]

Grebe et al.

[11] Patent Number: 5,198,393
[45] Date of Patent: Mar. 30, 1993

[54] RARE EARTH-CONTAINING FRITS HAVING A HIGH GLASS TRANSITION TEMPERATURE AND THEIR USE FOR THE PRODUCTION OF ENAMELS HAVING IMPROVED HEAT RESISTANCE

[75] Inventors: Vernon J. Grebe, Baltimore; Elie E. Saad, Burtonsville; Derek W. Sproson; Arthur C. Stidham, both of Baltimore, all of Md.

[73] Assignee: Miles Inc., Pittsburgh, Pa.

[21] Appl. No.: 734,389

[22] Filed: Jul. 23, 1991

[51] Int. Cl.$^5$ .............................. C03C 3/089
[52] U.S. Cl. ............................ 501/65; 501/64; 501/21
[58] Field of Search ............... 501/21, 27, 30, 64, 501/14, 25, 26, 58, 72, 65

[56] References Cited

U.S. PATENT DOCUMENTS

| | | | |
|---|---|---|---|
| 3,928,668 | 12/1975 | Snow | 427/14 |
| 4,437,192 | 3/1984 | Fujiu et al. | 501/25 X |
| 4,446,241 | 5/1984 | Francel et al. | 501/14 |
| 4,520,115 | 5/1985 | Speit et al. | 501/58 X |
| 4,746,578 | 5/1988 | Kondo et al. | 501/14 X |
| 4,975,391 | 12/1990 | Shimizu et al. | 501/21 |
| 5,039,631 | 8/1991 | Krashkevich et al. | 501/64 |
| 5,075,263 | 12/1991 | Schittenhelm et al. | 501/25 |

Primary Examiner—Karl Group
Assistant Examiner—Chris Gallo
Attorney, Agent, or Firm—Joseph C. Gil; Thomas W. Roy

[57] ABSTRACT

The present invention is directed to an alkali borosilicate frit which is capable of being applied to a metal substrate by the dry powder electrostatic process at a transfer efficiency of at least 70%, has a glass transition temperature of >525° C. and contains, based on the total weight of the frit:

| Oxide | Wt % |
|---|---|
| $K_2O$ | 6 to 10 |
| $Na_2O$ | 5.5 to 9 |
| $LiO_2$ | 0 to 4 |
| $ZrO_2$ | 0 to 4 |
| $TiO_2$ | 0 to 4 |
| ZnO | 0 to 15 |
| $B_2O_3$ | 8 to 15 |
| $SiO_2$ | 40 to 60 |
| $La_2O_3$ | 3 to 9 |
| CaO | 0 to 15 |
| F | 0 to 2 |
| $Fe_2O_3$ | 0 to 3 |
| CoO | 0 to 5 |
| NiO | 0 to 5, | wherein the total weight of CoO plus NiO is at least 1.

The present invention is also directed to enamels for self-cleaning ovens containing these frits.

8 Claims, No Drawings

RARE EARTH-CONTAINING FRITS HAVING A HIGH GLASS TRANSITION TEMPERATURE AND THEIR USE FOR THE PRODUCTION OF ENAMELS HAVING IMPROVED HEAT RESISTANCE

BACKGROUND OF THE INVENTION

1. Field of the Invention

The present invention is directed to the production of rare earth-containing frits having a glass transition temperature of >525° C. and to the use of these frits for the production of enamels having improved heat resistance.

2. Description of the Prior Art

Currently available "pyrolytic" enamel systems exhibit crazing and/or flaking (hereinafter referred to as "failure") during pyrolytic oven self-cleaning cycles. These cycles may involve rapid (approximately 25°-30° C./min) temperature gradients to a final temperature of 500° to 525° C. for several hours followed by a rapid cool to ambient temperature. Typical lifetime testing involves 120 such thermal cycles representing a 10 year oven lifetime. Failure is especially evident in dry powder "electrostatic" porcelain enamel systems, as compared to conventional wet systems, which are much more flexible due to the availability of mill additions to tailor thermal properties. For dry powder systems, the thermal properties of the required enamel must be designed into the composition of the glass or glasses which comprise the system.

During the firing process of an enamel/steel composite, the enamel is transformed from a particulate compact to a relatively dense, monolithic coating due to the action of heat. The densification occurs by viscous flow. During cooling from the firing temperature, compressive stresses develop in the enamel due to its lower thermal expansion below the glass transition temperature than the steel substrate. Because ceramics and glasses fail almost exclusively in tension, high compressive stresses are a necessary requirement for a craze-free coating.

Failure in pyrolytic coatings occurs if the pyrolytic cleaning temperature is above the glass transition temperature of the coating. The glass transition is defined as the temperature range when the viscosity of the glass is approximately $10^{13}$ poise. In practical terms it is the temperature range where the physical properties of the glass change from that of an elastic solid to a viscoelastic material. Above the glass transition temperature viscous deformation will occur in response to an applied stress. This means that at or above the glass transition temperature, the glass comprising the coating will relax, the compressive stress will diminish and eventually during subsequent cleaning cycles the coating will be placed in tension, thereby increasing the probability of crazing. Another result of the coating experiencing a temperature higher that its glass transition temperature is general thermal degradation of the coating including discoloration, crystallization, iron oxide penetration and metallization. This behavior is qualitatively described as thermal durability. All of the aforementioned phenomena are undesirable and may aggravate flaking of an already crazed enamel coating. Flaking occurs when large pieces of a degraded enamel coating physically separates from the metal substrate, leaving the substrate exposed.

It is also known to prepare dry powder "pyrolytic" compositions by blending two or more frits or glasses which each possess certain desirable characteristics. For example, a typical composition may contain 50% by weight of a "soft, bonding" glass, i.e., a glass with a low glass transition temperature and low viscosity at the firing temperature which readily adheres or bonds to the metal substrate, and 50% by weight of a "hard, pyrolytic" glass, i.e., a system with a relatively high glass transition temperature which possesses excellent thermal durability, but usually exhibits little or no bond. Typical glass transition temperatures for the bonding glass may be 450° to 480° C., while the glass transition temperature for the pyrolytic glass is 480° to 510° C. The problem with this approach is that during the self-cleaning heating cycle, one or both of the glasses are exposed to a temperature which is greater than their respective glass transition temperatures, which leads to failure as previously discussed.

Accordingly, it is an object of the present invention to develop a frit which may be applied by the dry powder electrostatic process to form an enamel which is suitable for use as a coating for self-cleaning ovens and which does not craze or flake during repeated self-cleaning cycles. It is an additional object of the present invention to provide a frit which may be fired at a temperature of 810° to 840° C. for 3 to 10 minutes to form a coating which has densified and matured sufficiently to yield a smooth continuous coating. It is a further object of the present invention to provide a frit which is suitable for the preparation of coatings which possess excellent acid resistance, good to excellent bond on pickled extra low carbon steel and also exhibit acceptable color and gloss characteristics.

These objects may be achieved in accordance with the present invention as described hereinafter.

SUMMARY OF THE INVENTION

The present invention is directed to an alkali borosilicate frit which is capable of being applied to a metal substrate by the dry powder electrostatic process at a transfer efficiency of at least 70%, has a glass transition temperature of >525° C. and contains, based on the total weight of the frit:

| Oxide | Wt % |
| --- | --- |
| $K_2O$ | 6 to 10 |
| $Na_2O$ | 5.5 to 9 |
| $LiO_2$ | 0 to 4 |
| $ZrO_2$ | 0 to 4 |
| $TiO_2$ | 0 to 4 |
| $ZnO$ | 0 to 15 |
| $B_2O_3$ | 8 to 15 |
| $SiO_2$ | 40 to 60 |
| $La_2O_3$ | 3 to 9 |
| $CaO$ | 0 to 15 |
| $F$ | 0 to 2 |
| $Fe_2O_3$ | 0 to 3 |
| $CoO$ | 0 to 5 |
| $NiO$ | 0 to 5, | wherein the total weight of CoO plus NiO is at least 1.

The present invention is also directed to enamels for self-cleaning ovens containing these frits.

DETAILED DESCRIPTION OF THE INVENTION

The frit compositions according to the present invention preferably have a glass transition temperature of >530° C., more preferably >535° C. Even though the frit compositions have an increased glass transition temperature, they may be fired at temperatures of less than 850° C., preferably 810° to 840° C., over a time period of 3 to 10 minutes.

The silica content is preferably 45 to 55% by weight, more preferably 48 to 53% by weight, based on the weight of the frit. CoO and NiO are each preferably present in an amount of 0 to 2% by weight, based on the weight of the frit. The total weight of CoO plus NiO is preferably at least 1.5% by weight, based on the weight of the frit. These latter oxides are added to the composition to improve the adhesion of the frit to metal substrates and to provide changes is color of the frit. Preferably, the frits do not contain PbO or BaO. CaO is preferably added in an amount of 2 to 15, preferably 5 to 10% by weight, based on the weight of the frit. The addition of CaO is used to increase the glass transition temperature of the frit. A minor amount, i.e., 0 to 3% by weight, based on the weight of the frit, $Al_2O_3$ may also be added to the frit composition.

While the frit compositions according to the invention are suitable for preparing enamel coatings by using either a dry or a wet process, it has been surprisingly found that these frit compositions are particularly suitable for use in the dry method, preferably the electrostatic method, for applying frits. The resulting enamels were surprisingly and unexpectedly found to be uniform, color stable and resistant to chemical attack by acids. This is particularly surprising in view of the recognition in the industry that the dry method, and more particularly the electrostatic method, is generally less forgiving, i.e., has a narrower margin for error, than other methods of frit application.

The electrostatic method for applying frits to a metallic substrate is well known in the art and described in U.S. Pat. No. 3,928,668, the disclosure of which is incorporated herein by reference. In accordance with this method, a frit, optionally having first been coated with a suitable agent to impart a high resistivity, is electrostatically deposited by spraying it uniformly over a substrate and fired to form an enamel. It has long been recognized that the method, although offering several processing advantages and resulting in an excellent enamel coating, is less forgiving than the known wet method of application. This sensitivity to small variations in the process may lead to poor quality in the resulting enamel.

In accordance with the present invention the frit must be capable of being applied by the dry powder electrostatic process at a transfer efficiency of at lest 70%, preferably at least 80%. The transfer efficiency is the percentage of the frit which is deposited on the substrate, based on the total weight of first which is sprayed.

In accordance with the present invention the frit is applied directly or indirectly to a metal substrate, preferably steel. By "indirectly" it is meant that the frit according to the present invention is applied to a ground coat, e.g., a bonding coat. If the steel has been pickled the frit according to the present invention may be directly applied to the metal substrate. If the steel has only been cleaned, it is recommended to apply a bonding coat prior to applying the frit according to the present invention.

In an optional embodiment of the present invention after the frit according to the present invention has been applied, a cover coat is then applied, either before or after the frit has been fired. By employing, e.g., a white or almond cover coat, it is possible to improve the aesthetics or appearance of the coating. Most preferably the frit according to the present invention is applied as the only coating to pickled steel.

It is an important advantage of the present invention that it is not necessary to blend the frit with other additives prior to applying it to a substrate using the wet or dry processes.

It is important for the enamels prepared from the frits according to the present invention to possess good acid resistance. When tested in accordance with the PEI—Porcelain Enamel Institute—acid resistance test, enamels prepared from the frits of the present invention were consistently rated AA.

In accordance with the method of application of the frit composition of the present invention, the frit is applied in an amount of approximately 30 grams per square foot. This amount of application results upon firing in an enamel having a thickness of about 5 mils.

EXAMPLES

Preparation of a Frit Composition

The following is a description of the procedure which was used for preparing a composition within the scope of the invention. The compositions of raw materials set forth in the following table were weighed, dry blended and charged into a glass melting furnace.

The compositions were melted in a laboratory scale gas-air fired rotary smelter for about 15-30 minutes at a temperature of 1100° to 1400° C. The resulting molten glass was poured into water to produce the frit. Additionally, frit compositions were melted in production scale continuous gas-oxygen fired smelters at a temperature of about 1200°-1300° C. The production smelted material was made into frit form by passing it through water-cooled rollers.

The frit material was comminuted until 80 to 85% by weight of the frit had an average particle size of less than 45 micrometers (325 mesh).

The frit was used to provide an enamel coating on steel samples using conventional dry application techniques.

Pickled steel coupons (20 gauge extra low carbon cleaned steel) were used as the substrate. The frits were applied and the samples were fired at a temperature of 730° to 870° C. Holding times of 3 to 10 minutes were used to simulate commercial firing conditions.

To simulate the extreme temperature gradients experienced in oven use conditions, a small testing furnace was constructed. The enamelled steel plates were then positioned inside the furnace over an oven heating element. The distance between the element and the enamelled steel plates could be adjusted to that which is experienced in an oven. The heating element was then heated through the temperature cycles experienced in a conventional self-cleaning oven. The sample was then judged for the presence and severity of crazing, discoloration or any other adverse reactions to the thermal treatment.

This test has been found to be more severe than the conditions experienced in actual practice. Enamelled steel substrates prepared from the frits of the present invention tended to show slight crazing only during this test. Currently utilized conventional powder pyrolytic compositions displayed extreme crazing and poor thermal durability.

When actually applied to an oven cavity and cycled through 120 self-cleaning cycles, no or only slight crazing or degradation was evident.

The enamelled steel substrates also demonstrated excellent acid resistance by achieving a rating of AA on the PEI scale and also demonstrated acceptable adhesion to pickled steel and acceptable color and gloss.

| Oxide | Example 1 Wt % | Example 1 Mole % | Example 2 Wt % | Example 2 Mole % | Example 3 Wt % | Example 3 Mole % |
|---|---|---|---|---|---|---|
| $K_2O$ | 8.52 | 6.154 | 8.52 | 6.156 | 8.75 | 6.133 |
| $Na_2O$ | 8.04 | 8.824 | 8.04 | 8.824 | 8.26 | 8.798 |
| CaO | 0.00 | 0.000 | 0.00 | 0.000 | 6.53 | 7.680 |
| MgO | 0.00 | 0.000 | 0.00 | 0.000 | 0.18 | 0.295 |
| ZnO | 9.22 | 7.707 | 9.22 | 7.708 | 0.00 | 0.000 |
| $B_2O_3$ | 12.83 | 12.543 | 12.83 | 12.544 | 13.19 | 12.503 |
| $SiO_2$ | 52.06 | 58.931 | 52.04 | 58.913 | 53.52 | 58.773 |
| $TiO_2$ | 3.92 | 3.338 | 3.92 | 3.338 | 4.03 | 3.331 |
| CoO | 0.48 | 0.436 | 0.98 | 0.891 | 0.49 | 0.431 |
| NiO | 1.47 | 1.339 | 0.98 | 0.892 | 1.51 | 1.332 |
| MnO | 0.01 | 0.009 | 0.02 | 0.018 | 0.01 | 0.009 |
| $La_2O_3$ | 3.43 | 0.716 | 3.43 | 0.716 | 3.52 | 0.714 |

Modifications and variations to the above described invention are possible and might occur to those skilled in the art in view of the present disclosure. It is however to be understood that such changes are within the scope of the invention as defined by the following claims.

What is claimed is:

1. An alkali borosilicate frit which may be applied by the dry powder electrostatic process at a transfer efficiency of at least 70% by weight, has a glass transition temperature of >525° C., an acid resistance on the PEI scale of AA and comprises, based on the total weight of the frit:

| Oxide | Wt % |
|---|---|
| $K_2O$ | 6 to 10 |
| $Na_2O$ | 5.5 to 9 |
| $Li_2O$ | 0 to 4 |
| $ZrO_2$ | 0 to 4 |
| $TiO_2$ | 0 to 4 |
| ZnO | 0 to 15 |
| $B_2O_3$ | 8 to 15 |
| $SiO_2$ | 40 to 60 |
| $La_2O_3$ | 3 to 9 |
| CaO | 0 to 15 |
| F | 0 to 2 |
| $Fe_2O_3$ | 0 to 3 |
| CoO | 0 to 5 |
| NiO | 0 to 5 | wherein the total weight of CoO plus NiO is at least 1.

2. The alkali borosilicate frit of claim 1 which may be fired at a temperature of less than 850° C. for a time period of 3 to 10 minutes.

3. The alkali borosilicate frit of claim 1 which has a $SiO_2$ content of 45 to 55% by weight, based on the weight of the frit.

4. The alkali borosilicate frit of claim 1 which contains 2 to 15% by weight of CaO, based on the weight of the frit.

5. An alkali borosilicate frit which may be applied by the dry powder electrostatic process at a transfer efficiency of at least 70% by weight, has a glass transition temperature of >525° C., an acid resistance on the PEI scale of AA and consists essentially of, based on the total weight of the frit:

| Oxide | Wt % |
|---|---|
| $K_2O$ | 6 to 10 |
| $Na_2O$ | 5.5 to 9 |
| $Li_2O$ | 0 to 4 |
| $ZrO_2$ | 0 to 4 |
| $TiO_2$ | 0 to 4 |
| ZnO | 0 to 15 |
| $B_2O_3$ | 8 to 15 |
| $SiO_2$ | 40 to 60 |
| $La_2O_3$ | 3 to 9 |
| CaO | 0 to 15 |
| F | 0 to 2 |
| $Fe_2O_3$ | 0 to 3 |
| CoO | 0 to 5 |
| NiO | 0 to 5 | wherein the total weight of CoO plus NiO is at least 1.

6. The alkali borosilicate frit of claim 5 which may be fired at a temperature of less than 850° C. for a time period of 3 to 10 minutes.

7. The alkali borosilicate frit of claim 5 which has a $SiO_2$ content of 45 to 55% by weight, based on the weight of the frit.

8. The alkali borosilicate frit of claim 5 which contains 2 to 15% by weight of CaO, based on the weight of the frit.

* * * * *